United States Patent
Alanazi et al.

(10) Patent No.: US 12,536,472 B2
(45) Date of Patent: Jan. 27, 2026

(54) METHOD AND SYSTEM FOR SYNTHESIZING PHENOMENON DATA USING ARTIFICIAL INTELLIGENCE

(71) Applicant: SAUDI ARABIAN OIL COMPANY, Dhahran (SA)

(72) Inventors: Mohammed K. Alanazi, Dhahran (SA); Abdulellah H. Abualshour, Dhahran (SA); Abdulaziz M. Alnutaifi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 582 days.

(21) Appl. No.: 18/154,674

(22) Filed: Jan. 13, 2023

(65) Prior Publication Data
US 2024/0242113 A1    Jul. 18, 2024

(51) Int. Cl.
*G06N 20/00* (2019.01)
*G06N 5/04* (2023.01)

(52) U.S. Cl.
CPC .............. *G06N 20/00* (2019.01); *G06N 5/04* (2013.01)

(58) Field of Classification Search
CPC ............ G06N 20/00; G06N 5/04; G06N 3/08; G06N 3/044; G06N 3/045; G06N 3/047
See application file for complete search history.

(56) References Cited

U.S. PATENT DOCUMENTS

| | | | |
|---|---|---|---|
| 2015/0185717 A1* | 7/2015 | Sayyar-Rodsari | G05B 17/02 700/31 |
| 2020/0351310 A1 | 11/2020 | Leighton et al. | |
| 2021/0256393 A1 | 8/2021 | Amjadian et al. | |
| 2022/0188645 A1* | 6/2022 | Nia | G06N 3/045 |
| 2022/0215243 A1* | 7/2022 | Narayanaswami | G06F 18/2193 |
| 2023/0281427 A1* | 9/2023 | Sakhinana | G06N 3/094 706/15 |
| 2023/0334290 A1* | 10/2023 | Rama | G06N 3/092 |
| 2025/0184119 A1* | 6/2025 | Han | G06N 3/0455 |

* cited by examiner

*Primary Examiner* — Dave Misir
(74) *Attorney, Agent, or Firm* — Osha Bergman Watanabe & Burton LLP

(57) ABSTRACT

Systems and a method are disclosed. The method includes collecting observed input data and observed output data from a data-generating system; determining reduced order observed output data; simulating reduced order simulated output data; performing a quality check; splitting the observed input data into a first observed input data group and a second observed input data group; training a first machine learning model; generating inferred input data with the first machine learning model; training a second machine learning model with the observed input data, the inferred input data, and the observed output data; and generating inferred output data with the second machine learning model. The method further includes adding noise to the inferred input data and the inferred output data to create synthetic input data and synthetic output data; and designing soft sensors based on the synthetic input data and the synthetic output data for deployment in an operational plant.

14 Claims, 5 Drawing Sheets

METHOD AND SYSTEM FOR SYNTHESIZING PHENOMENON DATA USING ARTIFICIAL INTELLIGENCE

BACKGROUND

Data confidentiality is a critical issue that hinders the progress of many technical collaborations of a company with external and internal partners. This limits potential studies that could benefit the company and enhance its business. Accordingly, there exists a need for creating and sharing synthetic operational data that captures the essential patterns and behavior of phenomena without compromising any real data. This data may be used in collaboration efforts while preserving confidentiality.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments related to a method for synthesizing phenomenon data using artificial intelligence are disclosed. The method includes collecting observed input data and observed output data from a data-generating system; determining reduced order observed output data from the observed output data; simulating reduced order simulated output data; performing a quality check of the reduced order observed output data with the reduced order simulated output data; splitting the observed input data into a first observed input data group and a second observed input data group; training a first machine learning model on the first observed input data group and the second observed input data group; generating inferred input data with the first machine learning model and the first observed input data group; training a second machine learning model with the observed input data, the inferred input data, and the observed output data; generating inferred output data with the second machine learning model, the inferred input data, and the observed input data; adding noise to the inferred input data and the inferred output data to create synthetic input data and synthetic output data; and designing soft sensors based on the synthetic input data and the synthetic output data for deployment in an operational plant.

In general, in one aspect, embodiments related to a non-transitory computer-readable memory comprising computer-executable instructions stored thereon that, when executed on a processor, cause the processor to perform steps, are disclosed. The instructions include: determining reduced order observed output data from observed output data; simulating reduced order simulated output data; performing a quality check of the reduced order observed output data with the reduced order simulated output data; splitting observed input data into a first observed input data group and a second observed input data group; training a first machine learning model on the first observed input data group and the second observed input data group; generating inferred input data with the first machine learning model and the first observed input data group; training a second machine learning model with the observed input data, the inferred input data, and the observed output data; generating inferred output data with the second machine learning model, the inferred input data, and the observed input data; adding noise to the inferred input data and the inferred output data to create synthetic input data and synthetic output data; and designing soft sensors based on the synthetic input data and the synthetic output data for deployment in an operational plant.

In general, in one aspect, embodiments related to a system for synthesizing phenomenon data using artificial intelligence are disclosed. The system includes a data-generating system configured to generate observed input data and observed output data; a physics-based first principles model configured to determine reduced order observed output data from the observed output data and simulate reduced order simulated output data; a computer system comprising a processor, configured to: perform a quality check of the reduced order observed output data with the reduced order simulated output data, split the observed input data into a first observed input data group and a second observed input data group based on correlations; train a first machine learning model on the first observed input data group and the second observed input data group, generate inferred input data with the first machine learning model and the first observed input data group, train a second machine learning model with the observed input data, the inferred input data, and the observed output data, generate inferred output data with the second machine learning model, the inferred input data, and the observed input data, and add noise to the inferred input data and the inferred output data to create synthetic input data and synthetic output data.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
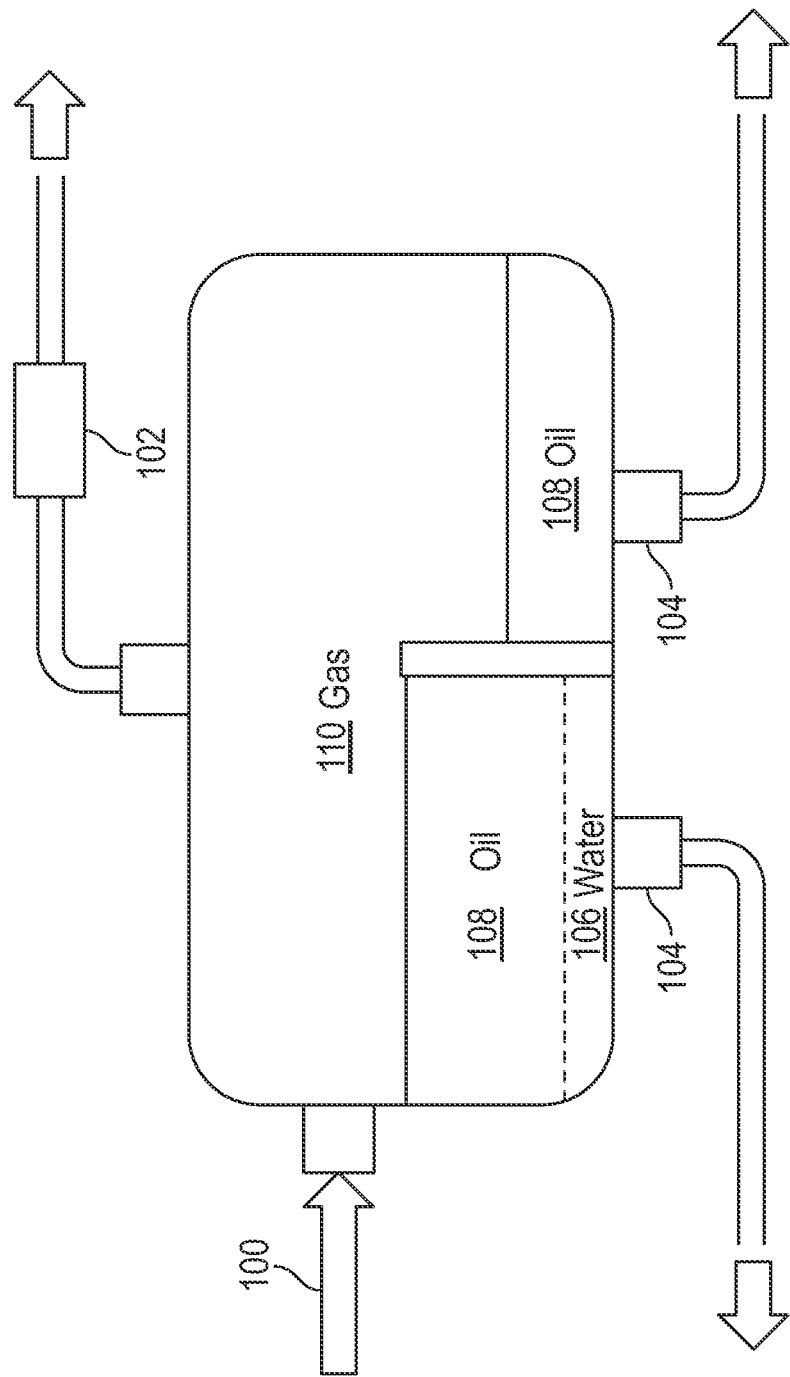
FIG. 1 shows a three phase separator according to one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-4, any component described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to a novel approach to capturing realistic patterns in real data and then automating the generation of realistic synthetic data in real-time utilizing a simulation model. The method may be used online or offline, depending on the nature of the streamed data. For example, during a prototyping phase, it may be best to use offline simulation data. In a production phase, however, it may be best to use the online real-time data.

The method uses two simulation approaches: a physics first principles modelling and an AI data-driven modelling. It also utilizes a system-tuned Gaussian noise technique to add an additional layer of realism to further protect the confidentiality of the data. The method allows the use of confidential data from different systems, including historical, lab, and simulation models to create synthetic data that mimic real phenomena. The synthetic data may be shared on collaborative projects with external partners without compromising the confidentiality of real data and the secrecy of internal investigations.

These embodiments may provide at least one of the following advantages: a physics-based first principles modelling for simulating processes; data-driven synthesis and surrogate modelling using AI/neural networks; and further protection of data by adding a layer of system-tuned Gaussian noise. The aim of this innovation is to capture the patterns of various real data-generating systems and use simulation models to reproduce the relationships, correlations, and structures of the real data in simulated synthetic data. The resulting synthetic data may be shared with collaborators who can study the properties of the real data-generating system through the surrogate data.

An example use case of the proposed method is to understand the feed behavior of a gas oil separation plant (GOSP) by calculating yields and properties rigorously based on thermodynamic equations using physics-based first principles simulations coupled with artificial intelligence (AI) techniques. The combination of the physics-based and AI models to generate GOSP data preserves the structures contained in the data (correlations, statistical distributions, etc.) without disclosing any real/actual data. The preserved structures may enable the development of soft or virtual sensors that, after testing and validation, may be deployed in operational GOSPs.

In keeping with the example use case for embodiments disclosed herein, FIG. 1 depicts the principal component in a GOSP, the gas oil separator. It is a vessel that separates fluids extracted from wells into gas and liquids. Separators may be two phase or three-phase. The former only separates gas from liquids. The latter further separates water from oil. The embodiment in FIG. 1 represents a three-phase separator.

A mix of gas and fluids coming from a well enters the separator through an inlet (100). A mixed emulsion of vaporized liquids and gas (110) exit through the top of the vessel, where the vaporized liquids are removed with a mist extractor (102). Turbulent flow allows gas bubbles to escape more quickly than laminar flow. Gravity acts as the main force separating the liquids into water (106) and oil (108). Lighter fluids rise up while the heavier fluids sink to the bottom. The different fluids then exit the vessel through exit valves (104) at the bottom. The amount of gas/liquid separation is a function of factors including the separator's operating pressure and temperature, the length of time of the fluids have remained mixed, and the type of flow of the fluid (turbulent versus laminar). Separators may be shaped as horizontal cylinders, vertical cylinders, or spheres. Low pressure separators can handle pressures from 10-180 psi, medium-pressure separators can handle pressures from 230-700 psi, and high-pressure separators can handle pressures from 975-1500 psi.

Figure 2A:
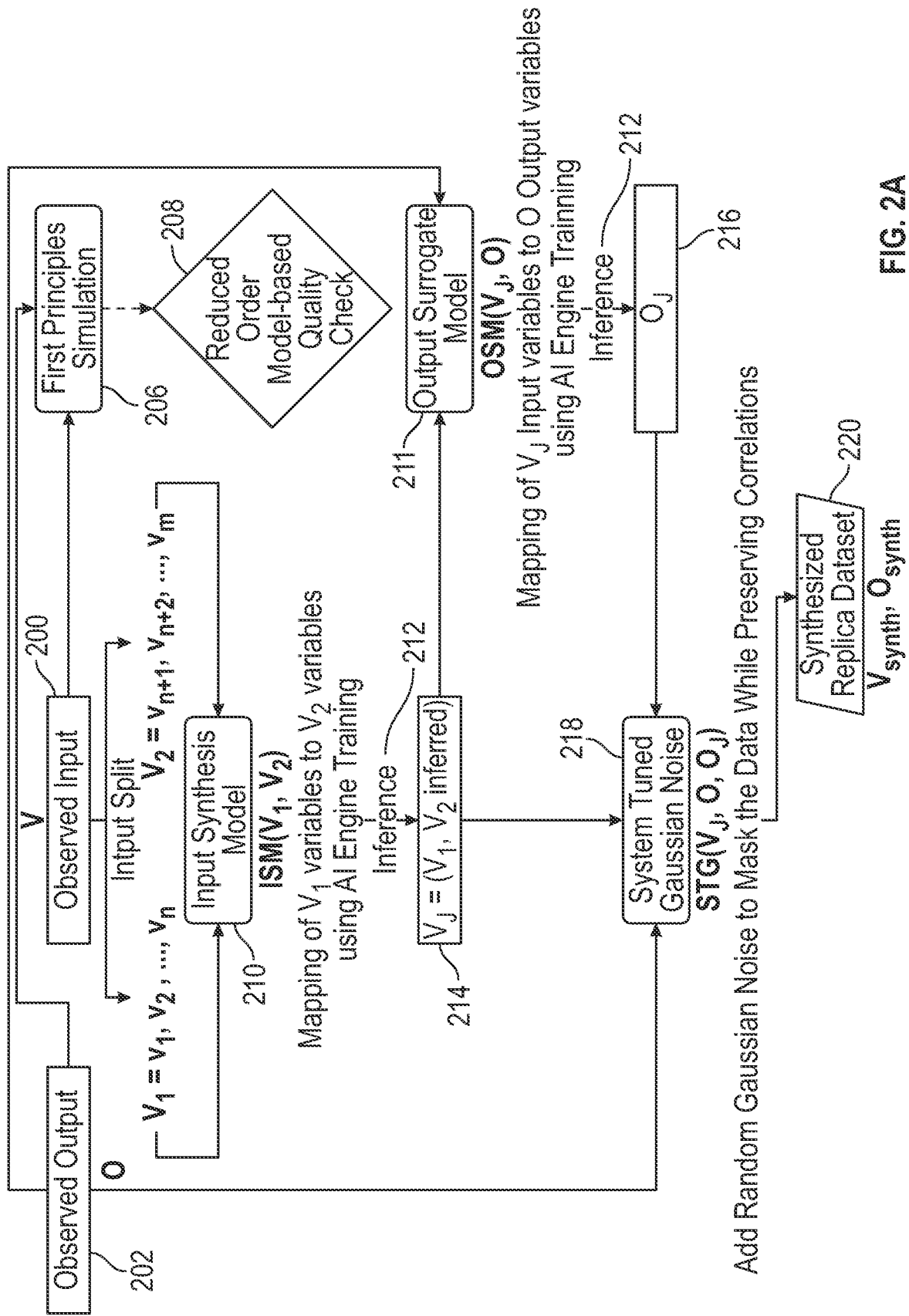
FIG. 2A shows a schematic of the methodology disclosed herein, according to one or more embodiments.

FIG. 2A presents a schematic showing the components of the methodology disclosed herein. Applying the methodology to the example of a separator introduced in FIG. 1, the observed input data (200) and the observed output data (202) are first identified. The observed input data may be the gas-oil ratio, the specific gravity, and the flow rate of the effluent entering the separator. The observed input data (200) may include the pressure and temperature within the separator. The observed output data (202) may be the yield of separated gas, oil, and water. In general, both the observed input data (200) and the observed output data (202) are time series data. These observed input data (200) and observed output data (202) may be collected at one separator or from many different separators of similar design.

As part of the application of the methodology, a reduced order quality check (208) must be performed. The observed output data (202) are reduced in order to contain only their principal structures. For example, an assumed polynomial relationship given by physical relationships is approximated by a linear model. This would result in a reduced order of the observed output data (202).

Next, a physics-based simulation model takes the observed input data (200), creates simulated output data, and reduces the order of the simulated output data, as was done for the observed output data (200). If, for given observed input data (200), the physics-based first principles simulation (206) does not produce reduced order simulated output data similar to the reduced order observed output data (202), the data-generating system must be re-evaluated for an error in the understanding of the data-generating system or for noise in the data-generating system that is giving rise to erroneous measurements. For the example of the GOSP, a gas oil separator is simulated using observed input values of the gas oil ratio, specific gravity, temperature, etc., and the physics-based simulation model determines the yield of separated gas, oil, and water that will be produced. Observed input data (200) that passes the reduced order quality check using the physics-based first principles simulation may be split into two groups, a first observed input data group, denoted $V_1$, and a second observed input data group, denoted $V_2$. Thus, $V_1$ is a subset of the observed input set V. In an example scenario where both temperature and pressure were correlated input variables, regression could predict one from the other. On this basis, the temperature values are placed in group $V_1$ and the pressure values are placed in group $V_2$. In one or more embodiments, subject matter experts may provide guidance on which observed input data (200) may be divided into interdependent groups. More specifically, in one or more embodiments, physics/chemistry interdependencies rules are used in collaboration with subject matter experts to identify the pairs that can be regressed from each other as input/output pairs. This is also fine-tuned and modified depending on the phenomenon.

The Input Synthesis Model (ISM) (210) is a first AI neural network that maps the variables in the first observed input data group to those in the second observed input data group. Once a mapping is learned, the ISM may take observed input data (200) and generates inferred input data from it. The term 'inferred' or 'inference' (212) as used herein is taken to be synonymous with the action of a neural network to produce simulated data. The observed input data (200) and the inferred input data created from it may be combined in a new array of pairs of data denoted by $V_J=(V_1, V_{inferred})$ (214) (an element from the observed input data (200) and its corresponding element of the inferred input data constitute a single datum in the new array of data, $V_J$).

$V_J$ may be used as the input for a second AI neural network, the Output Surrogate Model (OSM) (211). The corresponding output elements for training the OSM (211) are the original observed output data (202), denoted O. The OSM (211) learns a mapping that relates the elements of $V_J$ with the elements of O. Once this neural network is learned, 'inference' (212) produces output elements $O_J$ (216) from the input elements of $V_J$.

To generate the synthesized data, System-Tuned Gaussian Noise (STGN) (218) must be incorporated. The STGN addition process takes as input $V_J$ and $O_J$, determines the statistical characteristic of the STGN from O, and then adds Gaussian noise to $V_J$ and $O_J$ while preserving their underlying statistical structures. This results in the synthetic input data and synthetic output data pairs (220), denoted $V_{synth}$ and $O_{synth}$, respectively, that may be used in numerical experiments with collaborating parties.

Figure 2B:
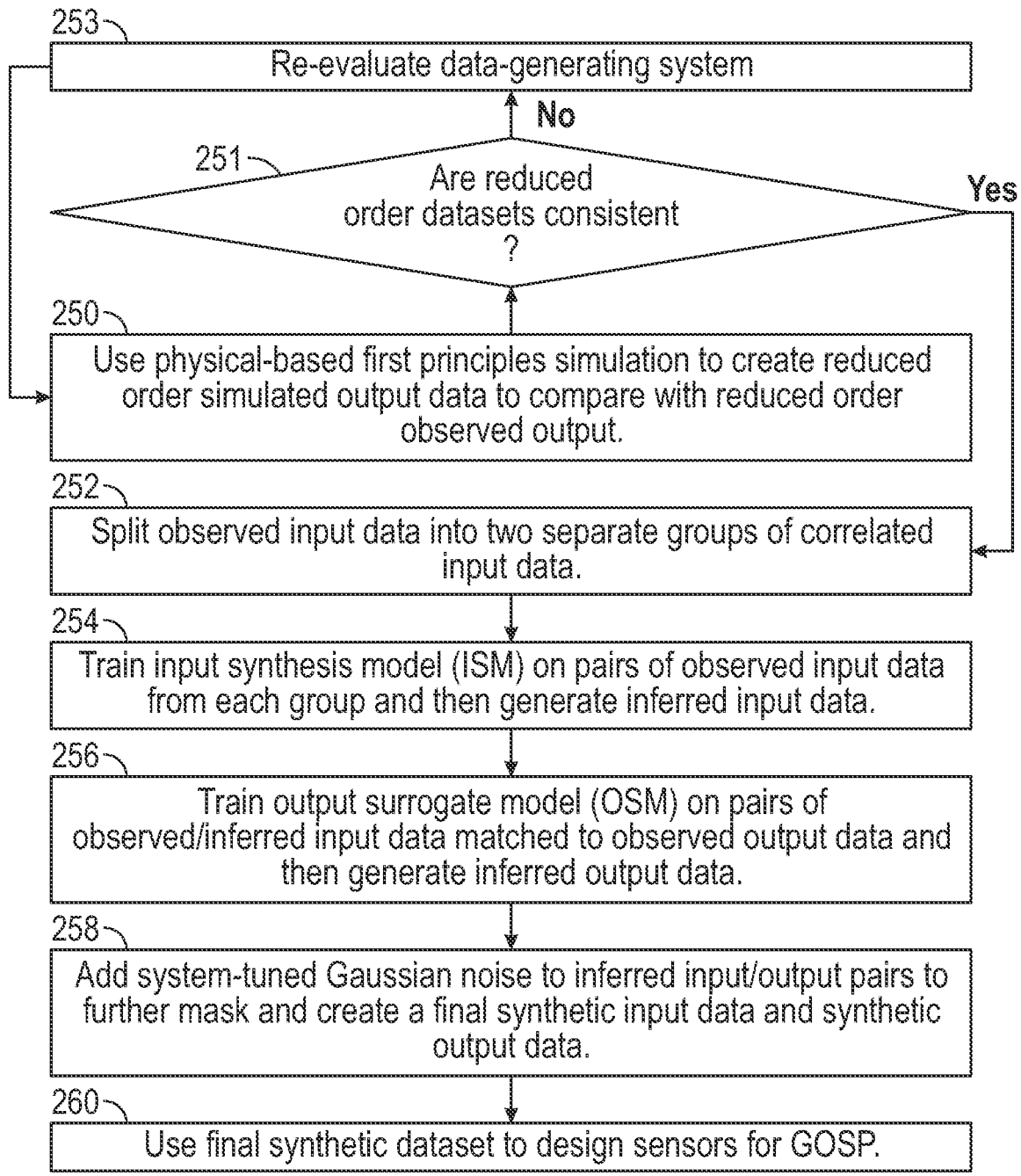
FIG. 2B shows a workflow for the methodology disclosed herein, according to one or more embodiments.

FIG. 2B takes the schematic of the features presented in FIG. 2A and presents their use as a workflow. In Step 250, a physics-based first principles simulation generates reduced order output data for given input data, and is compared with a reduced order version of the observed output data. In Step 251, a quality check is performed: If the reduced order first principles simulation is consistent with the reduced order output data, the method proceeds to Step 252. If not, in Step 253, the data-generating system must be re-evaluated; in this case, either there is a problem with the data (e.g., noise), or else a problem of the understanding of the data-generating system.

If Step 252 is reached, the observed input data is split into two separate groups of correlated (i.e., statistically-related) input data, with one element of each correlated pair of input data in each of the groups. In Step 254, the ISM is trained using the correlated input-input pairs. The goal is to be able to synthesize a new input data element given an observed input element. Once trained, the ISM synthesizes an inferred input element for each of a set of observed input data elements. These pairs of input data (observed and synthetic) are put as pairs into the data array $V_J$, detailed above. In Step 256, the OSM is trained using $V_J$ as input and observed output data elements, O, as output. Once trained, the OSM can take an element of $V_J$ and produce a synthetic output data element, $O_J$. In Step 258, Gaussian noise is added to the inferred input data and the inferred output data, thus randomizing and masking any relation to real data while preserving realistic data structures that can be analyzed. The resulting noisy synthesized input/output pairs of data are the final dataset which may be shared with collaborators and on which numerical analysis may be performed. In Step 260, for the embodiment of the GOSP presented above, the study of the synthetic dataset would lead to the design of soft sensors that may be installed in separators to measure variables and monitor performance. Although the examples above have focused on application of the methodology above to a GOSP, this is only one example application and is not meant to limit the scope of this disclosure. For example, the same methodology described may apply to any application where physics-based process models and AI models may be used to synthesize data that can be used by a third party to perform numerical experiments. Other uses of the proposed method, for example, may be to study oil to gas ratios, chemicals, water desalination, and power. More specifically, embodiments disclosed herein may be used in the context of systems in oil refining plants, power generation plants, NGL processing, gas processing, etc.

Simulating this process may first involve determining the true gas and oil rates based using first principles physics-based relationships (i.e., applying heat and material balance equations, thermodynamic equations, and physical/chemical properties relationships). The methods detailed above may then make use neural networks to generate an inferred dataset, to which noise may be added to create a final synthetic dataset, which may be given to another entity to be studied or evaluated.

A synthetic dataset may be constructed in this way to assess an oil and gas linear programming (LP) model without the need to look at any real data. Another example of a synthetic dataset that could be created and shared with collaborators would be the flow, temperature, and pressure measurements of a feed behavior analysis study. Yet another example of a complex dataset that could be synthesized would be the activation/deactivation rates between different catalysts; the non-linear relationship between these could be reproduced in the synthetic dataset.

Figure 3:
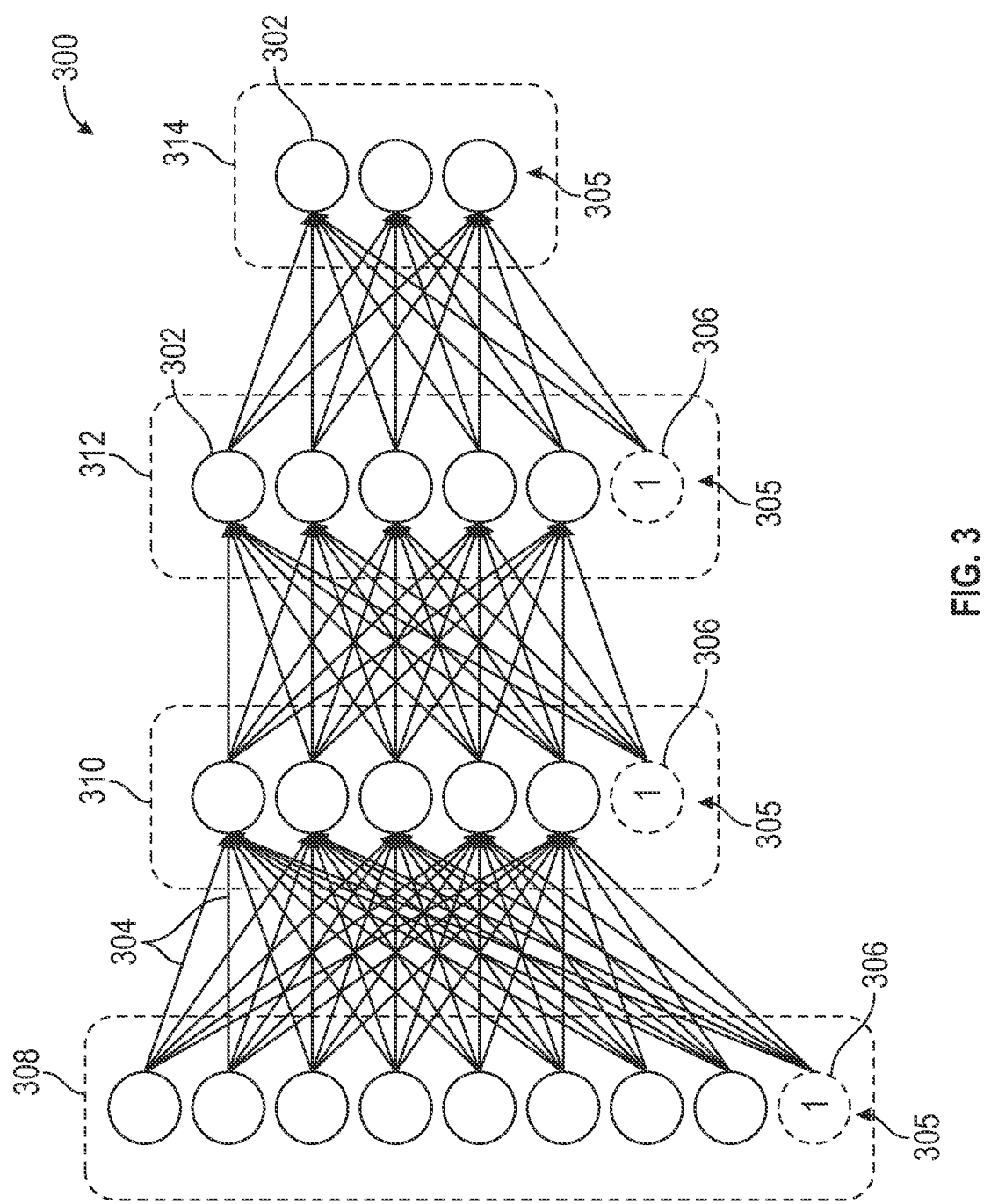
FIG. 3 shows a neural network according to one or more embodiments.

The ISM (210) and OSM (211) are both AI neural networks, a common machine learning (ML) architecture for prediction/inference. FIG. 3 shows an example of a neural network. At a high level, a neural network (300) may be graphically depicted as comprising nodes (302), where here any circle represents a node, and edges (304), shown here as directed lines. The nodes (302) may be grouped to form layers (305). FIG. 3 displays four layers (308, 310, 312, 314) of nodes (302) where the nodes (302) are grouped into columns, however, the grouping need not be as shown in FIG. 3. The edges (304) connect the nodes (302). Edges (304) may connect, or not connect, to any node(s) (302) regardless of which layer (305) the node(s) (302) is in. That is, the nodes (302) may be sparsely and residually connected. A neural network (300) will have at least two layers (305), where the first layer (308) is considered the "input layer" and the last layer (314) is the "output layer." Any intermediate layer (310, 312) is usually described as a "hidden layer". A neural network (300) may have zero or more hidden layers (310, 312) and a neural network (300) with at least one hidden layer (310, 312) may be described as a "deep" neural network or as a "deep learning model." In general, a neural network (300) may have more than one node (302) in the output layer (314). In this case the neural network (300) may be referred to as a "multi-target" or "multi-output" network.

Nodes (302) and edges (304) carry additional associations. Namely, every edge is associated with a numerical value. The edge numerical values, or even the edges (304)

themselves, are often referred to as "weights" or "parameters". While training a neural network (300), numerical values are assigned to each edge (304). Additionally, every node (302) is associated with a numerical variable and an activation function. Activation functions are not limited to any functional class, but traditionally follow the form:

$$A = f\left(\sum_{i \in (incoming)} [(\text{node value})_i (\text{edge value})_i]\right), \quad (1)$$

where i is an index that spans the set of "incoming" nodes (302) and edges (304) and $f$ is a user-defined function. Incoming nodes (302) are those that, when viewed as a graph (as in FIG. 3), have directed arrows that point to the node (302) where the numerical value is being computed. Some functions for $f$ may include the linear function $f(x)=x$, sigmoid function $$f(x) = \frac{1}{1+e^{-x}},$$

and rectified linear unit function $f(x)=\max(0,x)$, however, many additional functions are commonly employed. Every node (302) in a neural network (300) may have a different associated activation function. Often, as a shorthand, activation functions are described by the function $f$ by which it is composed. That is, an activation function composed of a linear function $f$ may simply be referred to as a linear activation function without undue ambiguity.

When the neural network (300) receives an input, the input is propagated through the network according to the activation functions and incoming node (302) values and edge (304) values to compute a value for each node (302). That is, the numerical value for each node (302) may change for each received input. Occasionally, nodes (302) are assigned fixed numerical values, such as the value of 1, that are not affected by the input or altered according to edge (304) values and activation functions. Fixed nodes (302) are often referred to as "biases" or "bias nodes" (306), displayed in FIG. 3 with a dashed circle.

In some implementations, the neural network (300) may contain specialized layers (305), such as a normalization layer, or additional connection procedures, like concatenation. One skilled in the art will appreciate that these alterations do not exceed the scope of this disclosure.

As noted, the training procedure for the neural network (300) comprises assigning values to the edges (304). To begin training, the edges (304) are assigned initial values. These values may be assigned randomly, assigned according to a prescribed distribution, assigned manually, or by some other assignment mechanism. Once edge (304) values have been initialized, the neural network (300) may act as a function, such that it may receive inputs and produce an output. As such, at least one input is propagated through the neural network (300) to produce an output. Recall that a given dataset will be composed of inputs and associated target(s), where the target(s) represent the "ground truth", or the otherwise desired output. The neural network (300) output is compared to the associated input data target(s). The comparison of the neural network (300) output to the target(s) is typically performed by a so-called "loss function"; although other names for this comparison function such as "error function" and "cost function" are commonly employed. Many types of loss functions are available, such as the mean-squared-error function. However, the general characteristic of a loss function is that it provides a numerical evaluation of the similarity between the neural network (300) output and the associated target(s). The loss function may also be constructed to impose additional constraints on the values assumed by the edges (304), for example, by adding a penalty term, which may be physics-based, or a regularization term. Generally, the goal of a training procedure is to alter the edge (304) values to promote similarity between the neural network (300) output and associated target(s) over the dataset. Thus, the loss function is used to guide changes made to the edge (304) values, typically through a process called "backpropagation."

Further distinctions may be made among neural networks. One popular form of neural network is the convolutional neural network (CNN). The CNN assumes some kind of translational invariance in the features of the dataset being analyzed, i.e., the relationships between a node in a layer and its parent/children nodes is independent of where within a particular layer that node is. Those skilled in the art will appreciate that the ISM and OSM may be implemented as any suitable neural network, such as but not limited to a Feed Forward Neural Network, a Convolutional Neural Network, a Radial Basis Functional Neural Network, a Recurrent Neural Network, LSTM—Long Short-Term Memory, etc. Further, the ISM and OSM may be the same type of neural network, or different types of neural networks.

Figure 4:
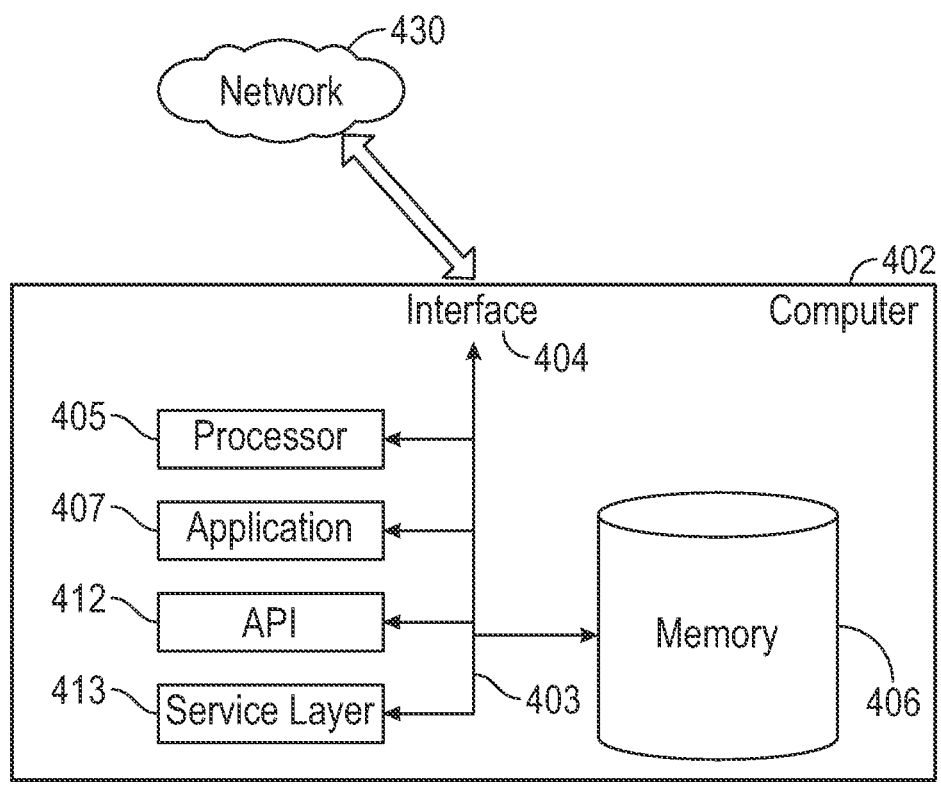
FIG. 4 shows a computer system in accordance with one or more embodiments.

For the embodiments presented above, the physics-based first principles simulation, the training of the ISM and OSM neural networks, and the implementation of the ISM and OSM neural networks to generate inferred data all require a computer processor and a connected computer system for practical use. For example, FIG. 4 depicts a block diagram of a computer system (402) used to provide computational functionalities associated with described algorithms, models, functions, processes, flows, and procedures as described in this disclosure, according to one or more embodiments. The illustrated computer (402) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or another suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, models, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing computer (402), wherein each computer (402) communicates over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:
   collecting observed input data and observed output data from a data-generating system;
   determining reduced order observed output data from the observed output data;
   simulating reduced order simulated output data;
   performing a quality check of the reduced order observed output data with the reduced order simulated output data;
   splitting the observed input data into a first observed input data group and a second observed input data group;
   training a first machine learning model on the first observed input data group and the second observed input data group;
   generating inferred input data with the first machine learning model and the first observed input data group;
   training a second machine learning model with the observed input data, the inferred input data, and the observed output data;
   generating inferred output data with the second machine learning model, the inferred input data, and the observed input data;

adding noise to the inferred input data and the inferred output data to create synthetic input data and synthetic output data;

wherein the noise is system-tuned Gaussian noise configured to mask the inferred input data and the inferred output data and further generate a final synthesized replica dataset, and designing soft sensors based on the final synthesized replica dataset for deployment in an operational plant, wherein the soft sensors predict behavior and obtain data measurements of the operational plant.

2. The method of claim 1, wherein the data-generating system is a gas oil separation plant (GOSP).

3. The method of claim 1, wherein the data-generating system is a power generation plant.

4. The method of claim 1, wherein the reduced order simulated output data are simulated with a physics-based first principles model.

5. The method of claim 1, wherein the first machine learning model is a neural network.

6. The method of claim 1, wherein the second machine learning model is a neural network.

7. A non-transitory computer-readable memory comprising computer-executable instructions stored thereon that, when executed on a processor, cause the processor to perform steps, comprising:

determining reduced order observed output data from observed output data;

simulating reduced order simulated output data;

performing a quality check of the reduced order observed output data with the reduced order simulated output data;

splitting observed input data into a first observed input data group and a second observed input data group;

training a first machine learning model on the first observed input data group and the second observed input data group;

generating inferred input data with the first machine learning model and the first observed input data group;

training a second machine learning model with the observed input data, the inferred input data, and the observed output data;

generating inferred output data with the second machine learning model, the inferred input data, and the observed input data;

adding noise to the inferred input data and the inferred output data to create synthetic input data and synthetic output data;

wherein the noise is system-tuned Gaussian noise configured to mask the inferred input data and the inferred output data and further generate a final synthesized replica dataset, and designing soft sensors based on the final synthesized replica dataset for deployment in an operational plant, wherein the soft sensors predict behavior and obtain data measurements of the operational plant.

8. The non-transitory computer-readable memory of claim 7, wherein the reduced order simulated output data are simulated with a physics-based first principles model.

9. The non-transitory computer-readable memory of claim 7, wherein the first machine learning model and the second machine learning model are both neural networks.

10. A system, comprising:

a computer system comprising a processor, configured to:

a data-generating system using the processor configured to generate observed input data and observed output data;

a physics-based first principles model using the processor configured to determine reduced order observed output data from the observed output data and simulate reduced order simulated output data;

perform a quality check of the reduced order observed output data with the reduced order simulated output data, split the observed input data into a first observed input data group and a second observed input data group based on correlations;

train a first machine learning model on the first observed input data group and the second observed input data group, generate inferred input data with the first machine learning model and the first observed input data group, train a second machine learning model with the observed input data, the inferred input data, and the observed output data, generate inferred output data with the second machine learning model, the inferred input data, and the observed input data, add noise to the inferred input data and the inferred output data to create synthetic input data and synthetic output data, wherein the noise is system-tuned Gaussian noise configured to the inferred input data and the inferred output data and further generate a final synthesized replica dataset, configure a plurality of soft sensors based on the final synthesized replica dataset for deployment in an operation plant, and wherein the soft sensors predict behavior and obtain data measurements of the operational plant.

11. The system of claim 10, wherein the data-generating system is a gas oil separation plant (GOSP).

12. The system of claim 10, wherein the data-generating system is a power generation plant.

13. The system of claim 10, wherein the first machine learning model is a neural network.

14. The system of claim 10, wherein the second machine learning model is a neural network.

* * * * *